(12) United States Patent
Naimi et al.

(10) Patent No.: US 6,922,332 B2
(45) Date of Patent: Jul. 26, 2005

(54) ELECTRIC CONNECTION BOX (75) Inventors: Fumikazu Naimi, Tokyo (JP); Kazuo Miyajima, Tokyo (JP); Masami Takase, Tokyo (JP); Koichi Shima, Kyoto (JP); Kiyoshi Takezawa, Kyoto (JP); Akihiko Hirata, Kyoto (JP)

(73) Assignees: Furukawa Electric Co., Ltd., Tokyo (JP); Omron Corporation, Kyoto (JP)

( * ) Notice: Subject to any disclaimer, the term of this patent is extended or adjusted under 35 U.S.C. 154(b) by 89 days.

(21) Appl. No.: 10/384,970

(22) Filed: Mar. 10, 2003

(65) Prior Publication Data

US 2003/0231482 A1 Dec. 18, 2003

(30) Foreign Application Priority Data

Apr. 10, 2002 (JP) .......................... 2002-108418

(51) Int. Cl.[7] ................................. H02B 1/26
(52) U.S. Cl. ....................... 361/641; 361/642; 361/648; 439/76.2
(58) Field of Search ................ 361/600, 601, 361/602, 603, 611, 622, 623, 624, 626, 627, 628, 629, 630, 631, 632, 636, 637, 638, 639, 640, 641, 642, 643, 647, 648, 649, 650, 656, 657, 679, 728, 822–824, 833, 834, 837

(56) References Cited

U.S. PATENT DOCUMENTS

| 4,956,748 A | * | 9/1990 | Yamamoto et al. | ......... 361/730 |
| 4,959,018 A | * | 9/1990 | Yamamoto et al. | ........ 439/76.1 |
| 5,777,843 A | * | 7/1998 | Younce | ...................... 361/641 |

FOREIGN PATENT DOCUMENTS

| JP | 3-124718 | 12/1991 |
| JP | 4-114718 | 10/1992 |
| JP | 07-025293 | 1/1995 |
| JP | 07-241020 | 9/1995 |
| JP | 2001-016746 | 1/2001 |
| JP | 2001-025137 | 1/2001 |

* cited by examiner

*Primary Examiner*—Phuong T. Vu
(74) *Attorney, Agent, or Firm*—Cohen, Pontani, Lieberman & Pavane (57) ABSTRACT An electric connection box includes upper and lower cases which accommodate therein bus bars, an insulator for the bus bars, fuses, and first relays. A relay module mounted with second relays is accommodated in the upper and lower cases. The electric connection box includes the relay module, but is compact in size, light in weight, low-priced, and low in heat generation due to contact resistance.

10 Claims, 7 Drawing Sheets

ELECTRIC CONNECTION BOX

BACKGROUND OF THE INVENTION

1. Technical Field

The present invention relates to an electric connection box, and more particular, to an electric connection box which is compact in size, light in weight, and low in cost.

2. Related Art

A passenger car is generally mounted with electrical components such as audio system, navigation system, air conditioner, electrically-powered seat. These components are supplied with electric power from a battery and operated under the control of a controller. For connection between the electrical components, the battery and the controller, wire harnesses and an electric connection box are usually employed. The connection box comprises a case to which fuses, relays, connector terminals for wire harnesses are attached and in which a wiring board provided with bus bars for distributing large electric currents is received.

Figure 7:
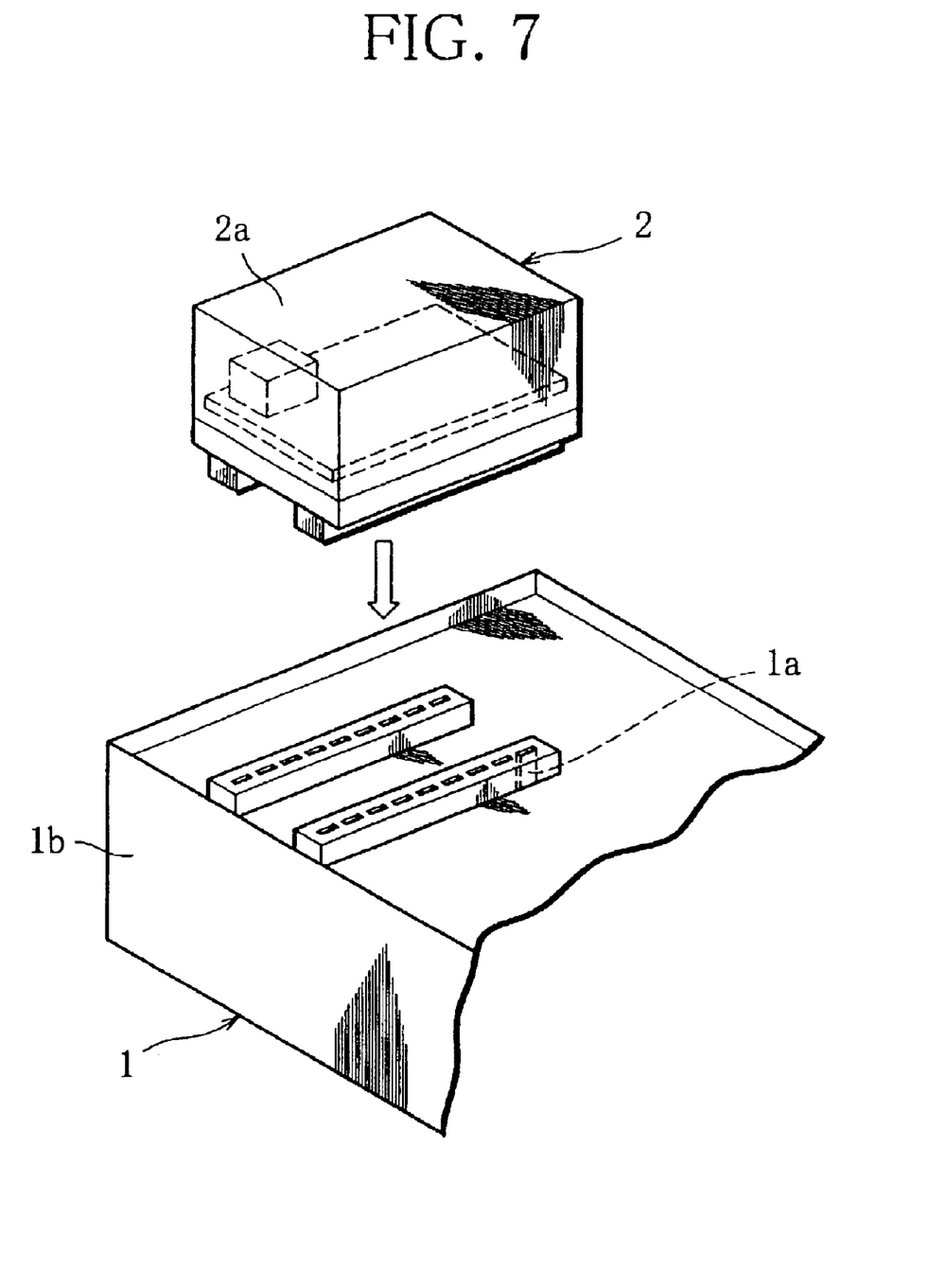
FIG. 7 is a schematic view showing an example of a conventional electric connection box.

By way of example, an electric connection box shown in FIG. 7 is adapted to be retrofitted with a relay module having relays (not shown) mounted thereon. In FIG. 7, the relay module 2 is connected to the electric connection box 1 through a connection terminal 1a that is exclusive to the relay module. The electric connection box 1 and the relay module 2 have individual cases 1b and 2a, and accordingly, the electric connection box is large in size and heavy in weight as a whole. In addition, the electric connection box has much wastage in design, construction, and assembly. Hence, the connection box is high in fabrication cost. In particular, the arrangement shown in FIG. 7, which requires the connection terminal 1a for connecting the relay module 2 to the electric connection box 1, increases the number of connection points, causing large heat generation by contact resistance.

SUMMARY OF THE INVENTION

An object of the present invention is to provide an electric connection box which includes a relay module but is compact in size, light in weight, low in cost, and low in heat generation by contact resistance.

According to the present invention, there is provided an electric connection box which comprises a case having at least bus bars, fuses and first relays accommodated therein, wherein a relay module mounted with second relays is accommodated in the case.

The electric connection box of the present invention includes a relay module, but is compact in size, light in weight, and is capable of reducing fabrication cost by eliminating wastage in design, construction, and assembly of the electric connection box, and capable of reducing heat generation by contact resistance.

DETAILED DESCRIPTION

Figure 1:
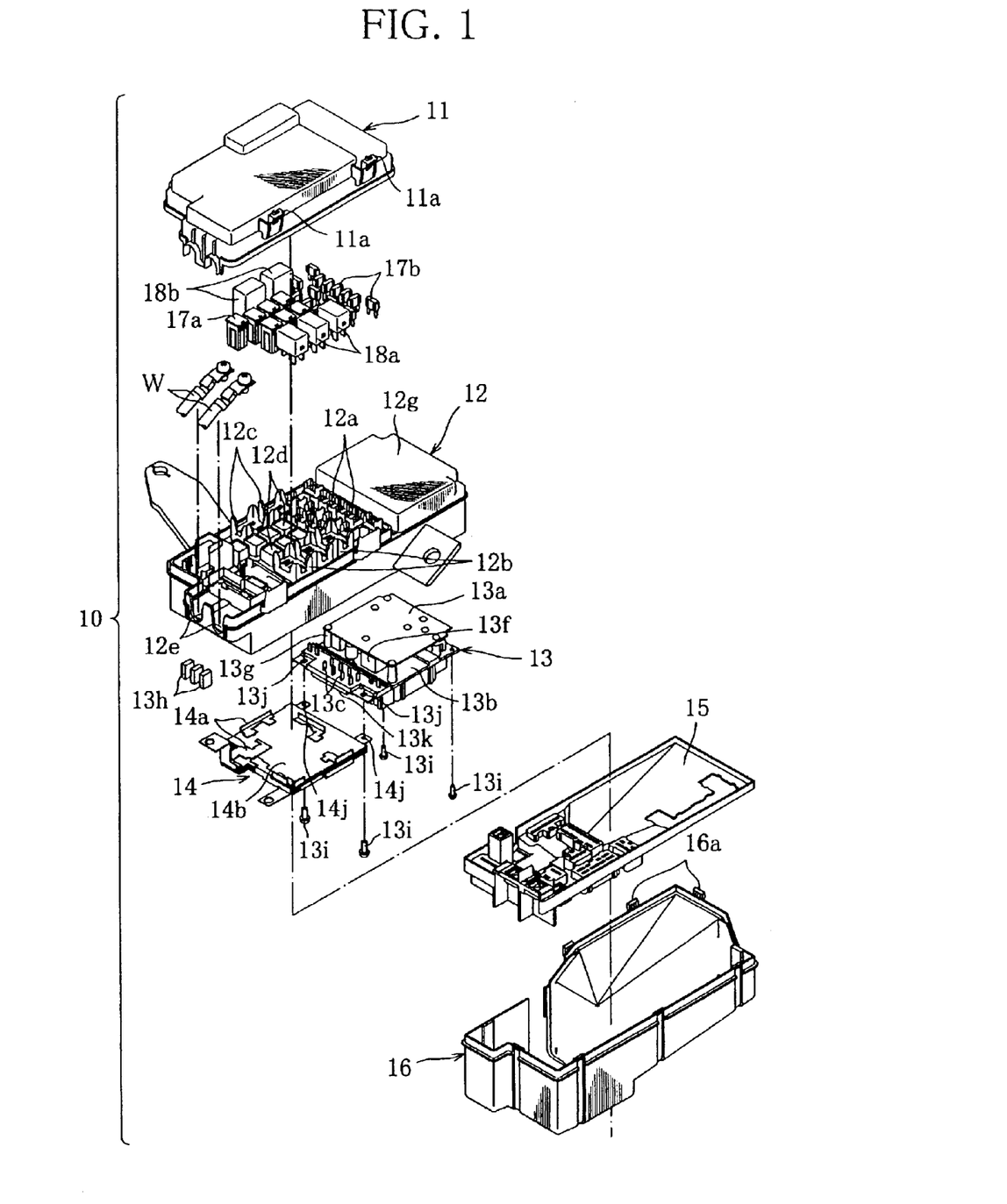
FIG. 1 is an exploded schematic view showing an electric connection box according to a first embodiment of the present invention.

With reference to FIG. 1, an electric connection box according to a first embodiment of the present invention will be explained.

The electric connection box 10 of this embodiment includes an upper cover 11, an upper case 12, a relay module 13, a bus bar module 14, a lower case 15, a lower cover 16, a fuse group 17a, 17b, and a relay group (first relays) 18a, 18b.

The upper cover 11 is made of synthetic resin and mounted on the upper case 12 to cover the same, and has engaging portions 11a formed at appropriate positions of side edges of the upper cover.

The upper case 12 has an upper side thereof formed with housings 12a–12d which are located at appropriate positions and which have appropriate shapes suitable for the mounting of the fuse group 17a, 17b and the relay group 18a, 18b. The upper case 12 has one end thereof formed with projections projecting therefrom in the longitudinal direction. Each projection is formed with a mounting portion 12e which is a recessed groove in which a wire W is mounted. An extension 12g constituting an upper portion of the upper case 12 covers the relay module 13.

The relay module 13 is provided with a communication control section 13a and a power control section 13b. The communication control section 13a is disposed above the power control section 13b with spacers 13g therebetween. The relay module 13 is fixed to a lower part of the upper case 12 by means of screws 13i threaded into tapped holes individually formed in four corners of the power control section 13b and of the lower part of the upper case 12. Alternatively, the relay module 13 may be fixed to an upper part of the lower case 15 by means of screws.

The communication control section 13a has a function of controlling multiplex communication, and is constituted by a board made of glass epoxy resin or the like on which electronic components such as a microcomputer are mounted. The power control section 13b is an electronic unit which operates to distribute power supply under the control of the communication control section 13a, and has bus bars 13k molded with synthetic resin insulator. Relays (second relays) 13f are mounted to an upper face of the power control section 13b. Tabs 13c are formed in end portions of the bus bars 13k so as to project from the upper face of the power control section 13b, and connected through receptacles (relay terminals) 13h to minifuses 17b which will be mentioned later.

The bus bar module 14 is comprised of bus bars 14a which are formed into desired shapes in accordance with a predetermined circuit pattern. The bus bars 14a are insulated from one another by means of an insulating plate 14b.

The lower case 15 is integrated with the upper case 12 between which the relay module 13 and the bus bar module 14 are interposed. The lower cover 16 is formed at its appropriate positions with engaging portions 16a, and is fitted to the upper case 12 by engaging these engaging portions 16a with corresponding engaging portions (not shown) of the upper case 12, thereby preventing the intrusion of rain water or the like into the case.

The fuse group 17a, 17b and the relay group 18a, 18b are fitted individually to the housings 12a–12d of the upper case 12, whereby they are attached to the upper case 12. On the upper case 12, the fuse group 17a, 17b and the relay group 18a, 18b are disposed so as to be divided into elements (first fuses 17a and high profile relays 18b) that are large in calorific value and other elements (minifuses 17b and low profile relays 18a) that are small in calorific value. The elements having low calorific values are disposed near the relay module 13.

In assembling the electric connection box 10 having the above construction, the relay modules 13 having the tabs 13 mounted in advance with the receptacles 13h are first mounted to the bus bar module 14. Then, the relay module 13 and the bus bar module 14 are fixed to a lower part of the upper case 12 by tightening screws 13i threaded into screw holes that are individually formed in the relay module 13 and in the lower part of the upper case 12, whereby these modules 13, 14 are mechanically fastened to each other and electrically connected at their junctions 13j, 14j to each other. Meanwhile, the relay module 13 may be solely mechanically or electrically connected by tightening the screws 13i.

Next, the upper case 12 is assembled onto the lower case 15, and the fuse group 17a, 17b and the relay group 18a, 18b are fitted individually to the housings 12a–12d of the upper case 12. Subsequently, the tabs 13c of the bus bars of the relay module 13 are connected to the minifuses 17b through the receptacles 13h. Then, the upper cover 11 is attached from above to the upper case 12, and the lower cover 16 is attached from below to the lower case 15, whereby the assemblage of the electric connection box 10 is completed.

As explained above, the electric connection box 10 has its relay module 13 that is received between the upper case 12 and the lower case 15, i.e., within these cases, and accordingly a case exclusive to the relay module 13 is unnecessary. Thus, the electric connection box 10 can be compact in size and made light in weight. In addition, the electric connection box 10 can be fabricated at low costs since the connection box can be designed, constructed, and assembled with less wastefully. Comparison between the electric connection box 10 and a conventional connection box that are substantially the same in performance indicates that the electric connection box 10 is reduced to 95%, 98%, and 98% of the conventional one in size, weight and cost, respectively.

In the electric connection box 10, among minifuses that have heretofore been mounted on the side of the bus bar module, those minifuses which are connected to the relay module are mounted on the side of the relay module, and accordingly, electrical connections between the bus bar module and the relay module can be extremely reduced. More specifically, the electric connection box 10 can reduce the number of connections from seven to two as compared to the conventional connection box.

Moreover, in the electric connection box 10, the relay module 13 is hardly influenced by heat generation on the side of the bus bar module 14 since the relay module 13 is disposed on the side of the minifuses 17b and the low profile relays 18a that are small in calorific value, and is covered by a box-like extension 12g of the upper case 12. This makes it possible to avoid temperature rise in electronic components of the relay module 13 that are poor in heat resistance.

Next, an electric connection box according to a second embodiment of this invention will be explained with reference to FIG. 2.

Figure 2:
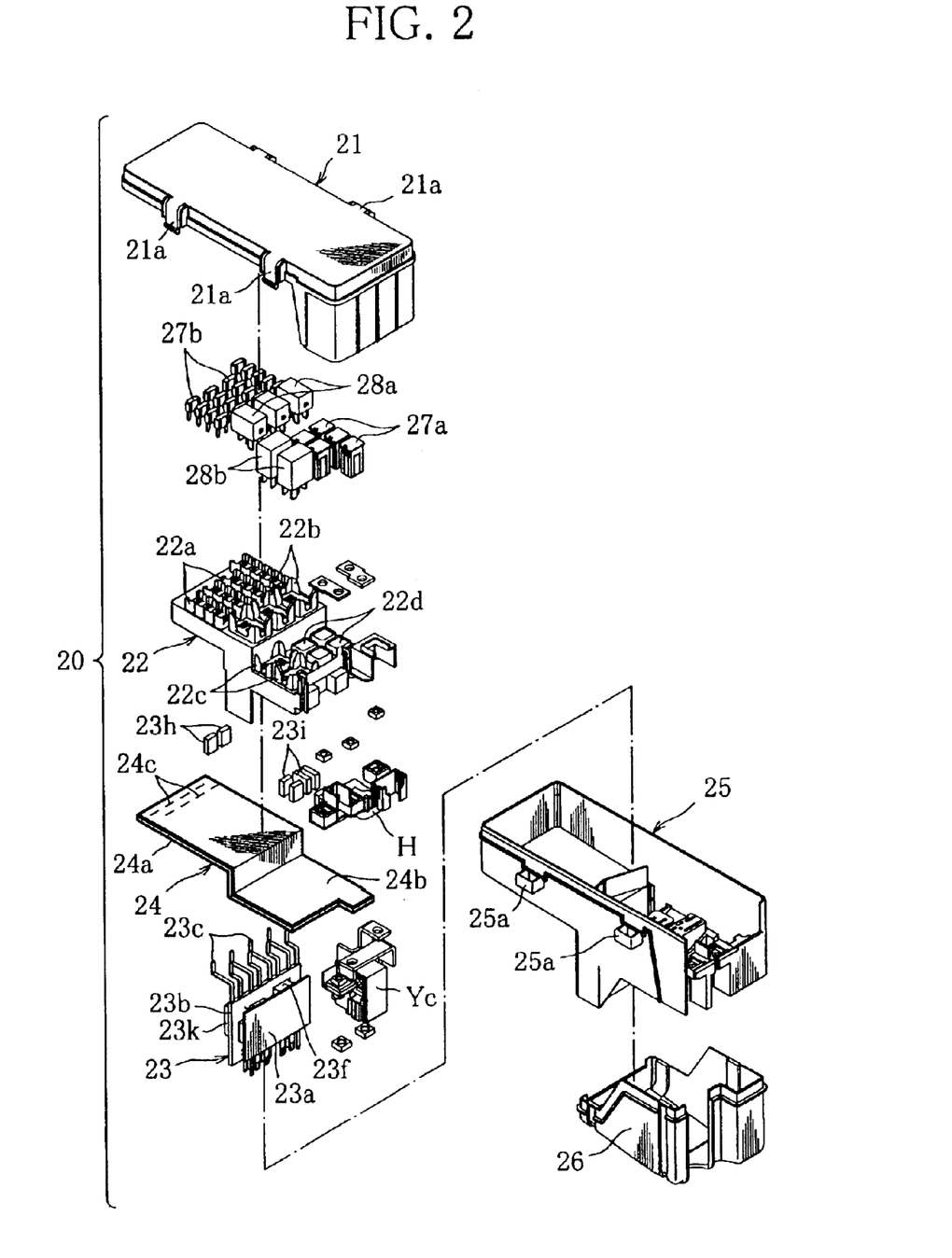
FIG. 2 is an exploded schematic view of an electric connection box according to a second embodiment.

In FIG. 2, those elements of the electric connection box 20 of the second embodiment which correspond to like elements of the connection box 10 of the first embodiment are denoted by like numeral (for instance, reference numeral 21, 22, etc. denote elements correspond to elements 11, 12, etc.), and duplicate explanations thereof will be omitted. This applies to third to sixth embodiments.

As shown in FIG. 2, the electric connection box 20 includes an upper cover 21, an upper case 22, a relay module 23, a bus bar module 24, a holder H, an electric current detecting unit Yc, a lower case 25, a lower cover 26, a fuse group 27a, 27b, and a relay group 28a, 28b.

The relay module 23 is vertically disposed and provided with a communication control section 23a having a function of controlling multiplex communication, and a power control section 23b operable under the control of the communication control section 23a. The communication control section 23a is disposed above the power control section 23b with spacers (not shown) therebetween, so that a desired distance is ensured between these sections 23a, 23b.

The power control section 23b has bus bars 23k molded with synthetic resin insulator. Tabs 23c are formed in end portions of the bus bars 23k so as to project from an upper face of the power control section 23b, and connected through receptacles 23h to minifuses 27b and connected through receptacles 23i to relays 28a, 28b. Relays 23f are mounted onto the upper face of the power control section 23b.

The bus bar module 24 is comprised of bus bars 24a which are formed into desired shapes in accordance with a predetermined circuit pattern. The bus bars 24a are insulated by an insulating plate 24b that is bent step-wise at its central part and that has one end portion thereof formed with insertion holes 24c permitting the tabs 23c of the relay module 23 to pass therethrough.

The electric current detecting unit Yc is comprised of an electronic unit serving to detect an amount of electric current. The unit Yc is supported by the holder H and is attached to the upper case 22 through the holder H.

The electric connection box 20 is assembled in the following manner.

First, the relay module 23 and the bus bar module 24 are temporally fixed by using jigs, after the tabs 23c are inserted into the insertion holes 24c, respectively. Then, the receptacles 23h, 23i are attached to the tabs 23 projecting from the insertion holes 24c. Thereafter, the relay module 23, the bus bar module 24, the holder H and the electric current detecting unit Yc are attached to the upper case 22 from below.

Next, the upper case 22 is assembled onto the lower case 25, with the fuse group 27a, 27b and the relay group 28a, 28b fitted individually to the housings 22a–22d and with wires (not shown) connected to appropriate portions, whereby the tabs 23c of the bus bars of the relay module 23 are connected to the minifuses 27b and the relays 28a, 28b through the receptacles 23h, 23i.

Then, the upper cover 21 is attached to the lower case 25 from above the upper case 22, so that engaging portions 21a are engaged with engaging portions 25a, respectively. Next, the lower cover 26 is attached to the lower case 25 from below, whereby the assemblage of the electric connection box 20 is completed.

As in the case of the electric connection box 10 of the first embodiment, the electric connection box 20 is compact in size and light in weight, even though it comprises the relay module 23. In addition, the electric connection box 20 is low in fabrication cost since it can be designed, constructed, and assembled with less wastefully, and is advantageous in that it can reduce heat generation due to contact resistance.

In the electric connection box 20, the relay module 23 is hardly influenced thermally since it is disposed on the side of those elements which are low in calorific value among elements of the fuse group 27a, 27b and the relay group 28a, 28b, thus ensuring a stable operation of the power control section 23b.

Figure 3:
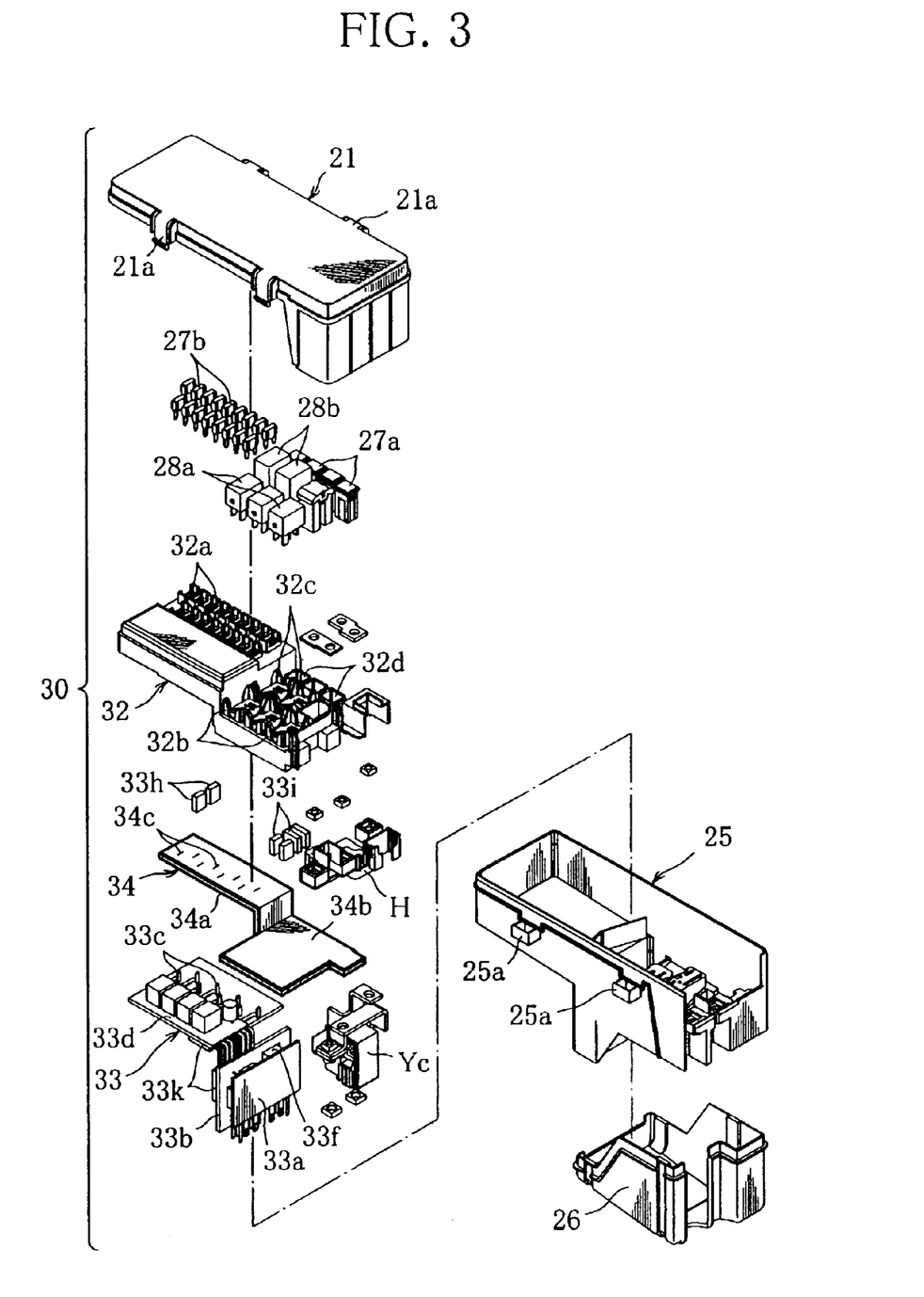
FIG. 3 is an exploded schematic view of an electric connection box according to a third embodiment.

In the following, an electric connection box according to a third embodiment of this invention will be explained.

As compared to the electric connection box 20 of the second embodiment, the electric connection box 30 shown in FIG. 3 differs in the arrangement of the fuse group 27a, 27b and relay group 28a, 28b and in the construction of the upper case 32, relay module 33 and bus bar module 34.

In association with the altered arrangement of the fuse group 27a, 27b and relay group 28a, 28b, the upper case 32 is formed with housings 32a–32d having appropriate shapes and arrangements suitable for the mounting of the fuse group 27a, 27b and relay group 28a, 28b.

The relay module 33 is provided with a communication control section 33a and power control sections 33b, 33d whose operations are controlled by the communication control section 33a. The communication control section 33a is disposed above at a distance from the power control section 33b, with spacers (not shown) interposed therebetween.

The power control sections 33b, 33d are provided with bus bars 33k molded with synthetic resin insulator. Tabs 33c formed in end portions of the bus bars 33k project from an upper face of the power control section 33d, and are connected through receptacles 33h to minifuses 27b. Receptacles 33i are connected to relays 28a, 28b. Relays 33f are mounted to the upper face of the power control section 33b.

The bus bar module 34 is comprised of bus bars 34a which are insulated by an insulating plate 34b that is bent step-wise at its central part and that is formed with insertion holes 34c permitting the tabs 33c of the relay module 33 to pass therethrough.

As in the case of the electric connection boxes 10, 20 of the first and second embodiments, the electric connection box 30 is compact in size and light in weight, even though it comprises the relay module 33. In addition, the electric connection box 30 is low in fabrication cost since it can be designed, constructed, and assembled with less wastefully, and can reduce heat generation due to contact resistance.

In the electric connection box 30, the power control section 33d is operable with stability, since it is disposed on the side of the minifuses 27b that are low in calorific value among elements of the fuse group 27a, 27b and the relay group 28a, 28b.

Figure 4:
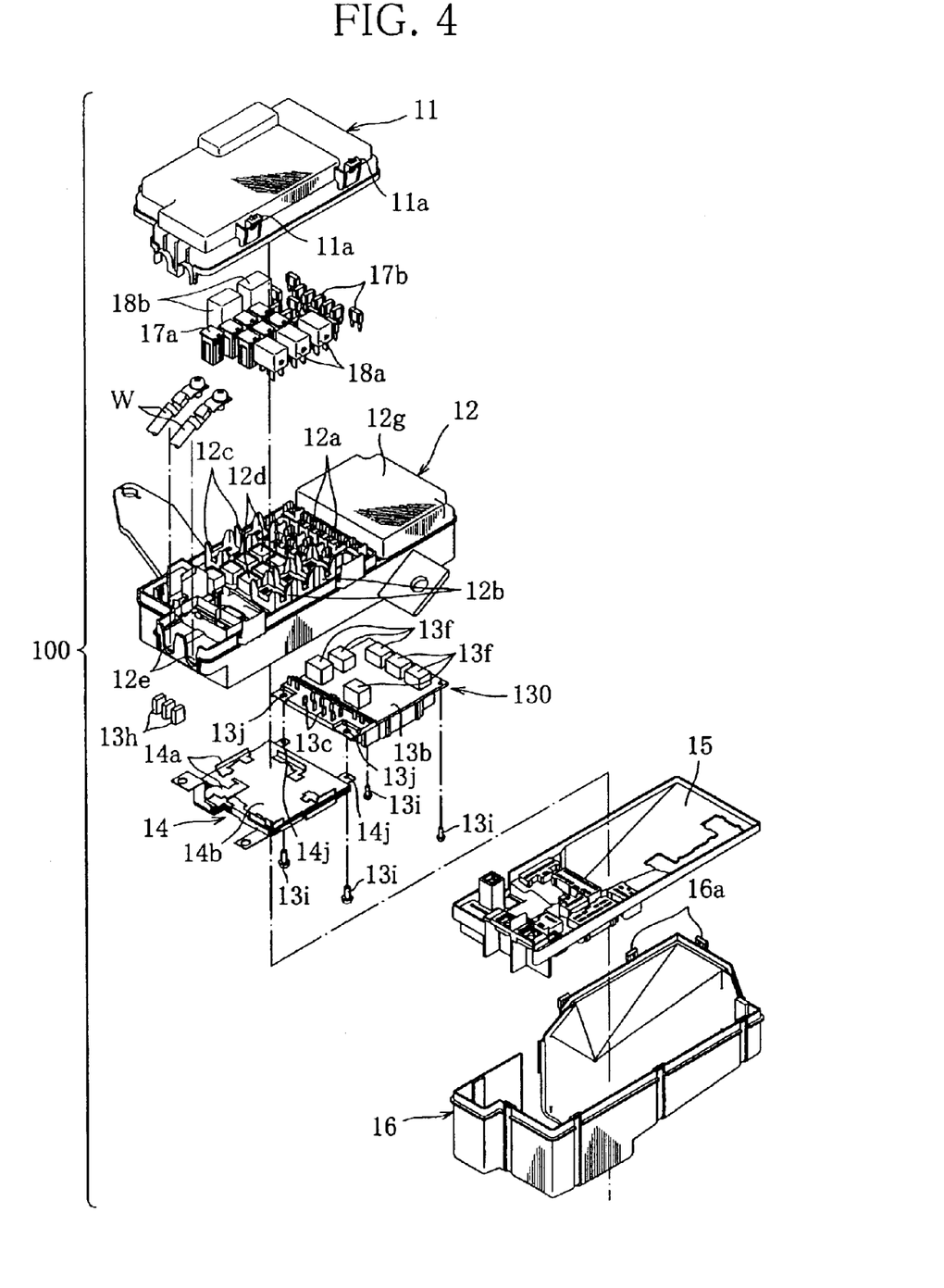
FIG. 4 is an exploded schematic view of an electric connection box according to a fourth embodiment.

Next, an electric connection box according to a fourth embodiment of this invention will be explained.

As shown in FIG. 4, the electric connection box 100 of this embodiment differs in the construction of the relay module 130 but is the same in the other respects as compared to the electric connection box 10 of the first embodiment.

More specifically, the relay module 130 is only provided with the power control section 13b, without having the communication control section since it does not require the multiplex communication function. Although the power control section of this embodiment is mounted with relays 13f, such relays may not be mounted thereon where unnecessary. As in the relay modules of the foregoing embodiments, the relay module 130 of this embodiment is connected to the bus bar module 14 with use of similar means (such as screws 13i, etc.). The power control section 13b having no multiplex communication function is controlled as in the case of an ordinary bus bar module section.

The electric connection box 100 does not require a case exclusive to the relay module 130 since the relay module is received between the upper case 12 and the lower case 15, i.e., within these cases. Thus, it is easy to make the electric connection box 100 compact in size and light in weight. The electric connection box 100 designed, constructed, and assembled with less wastefully can be fabricated at low cost. As in the first embodiment, the connection box 100 can achieve advantageous functions based on the arrangement of the relay module 130 and the construction of the upper case 12.

Figure 5:
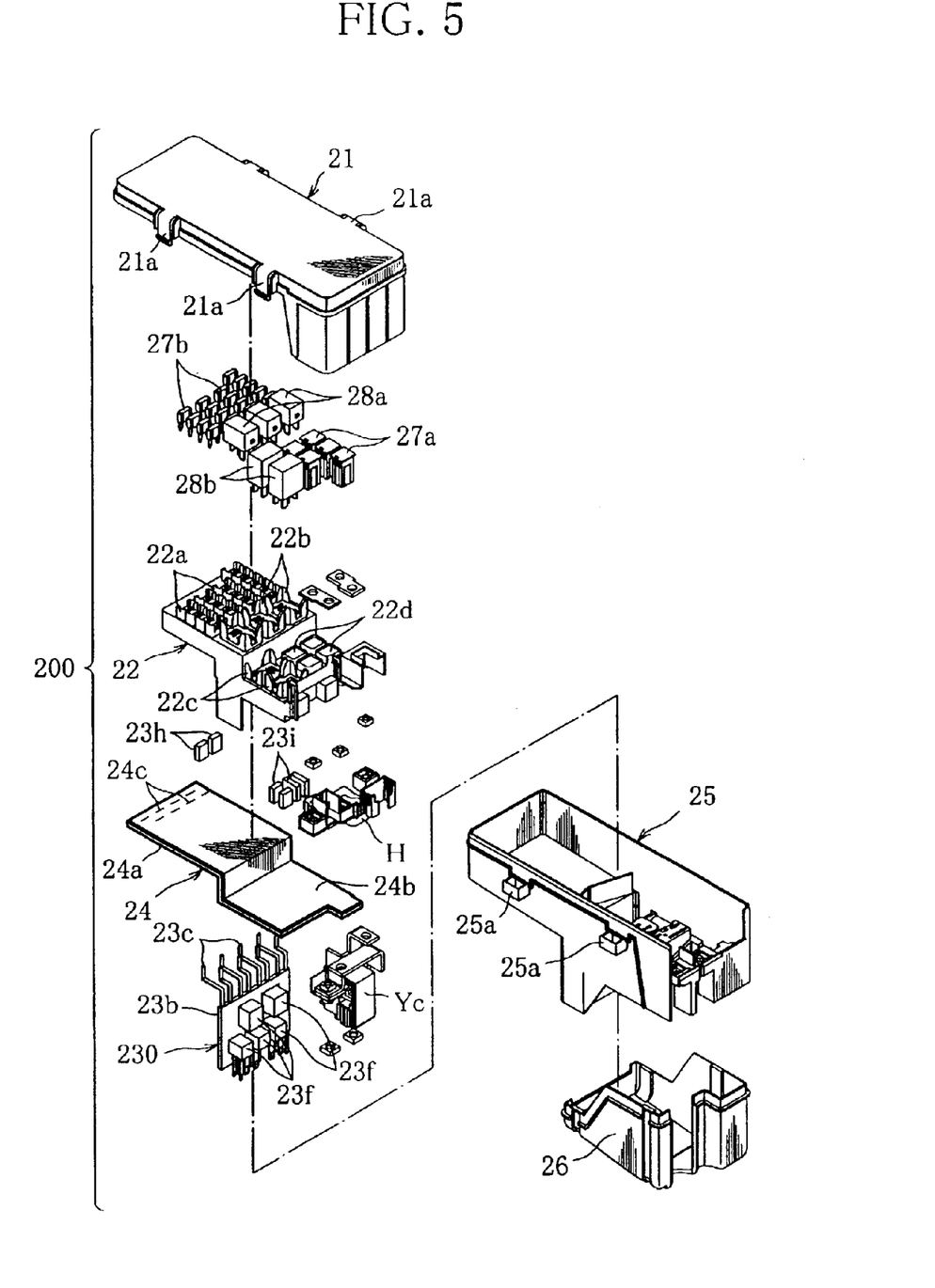
FIG. 5 is an exploded schematic view of an electric connection box according to a fifth embodiment.

FIG. 5 shows an electric connection box 200 according to a fifth embodiment of this invention. As compared to the electric connection box 20 of the second embodiment, the electric connection box 200 differs in the construction of the relay module 230 but is the same in the other respects.

Specifically, the relay module 230 is only provided with the power control section 23b on which exposed relays 23f are mounted, without having the communication control section. The power control section 23b of the electric connection box 200 is the same in construction and control as the fourth embodiment.

The electric connection boxes 200 is easy to make compact in size and light in weight by having the relay module 230 accommodated in the cases, and is less wasteful in various aspects so that low fabrication cost is achieved. As in the second embodiment, the connection box achieves advantageous functions based on the arrangement and construction of the relay module 230.

Figure 6:
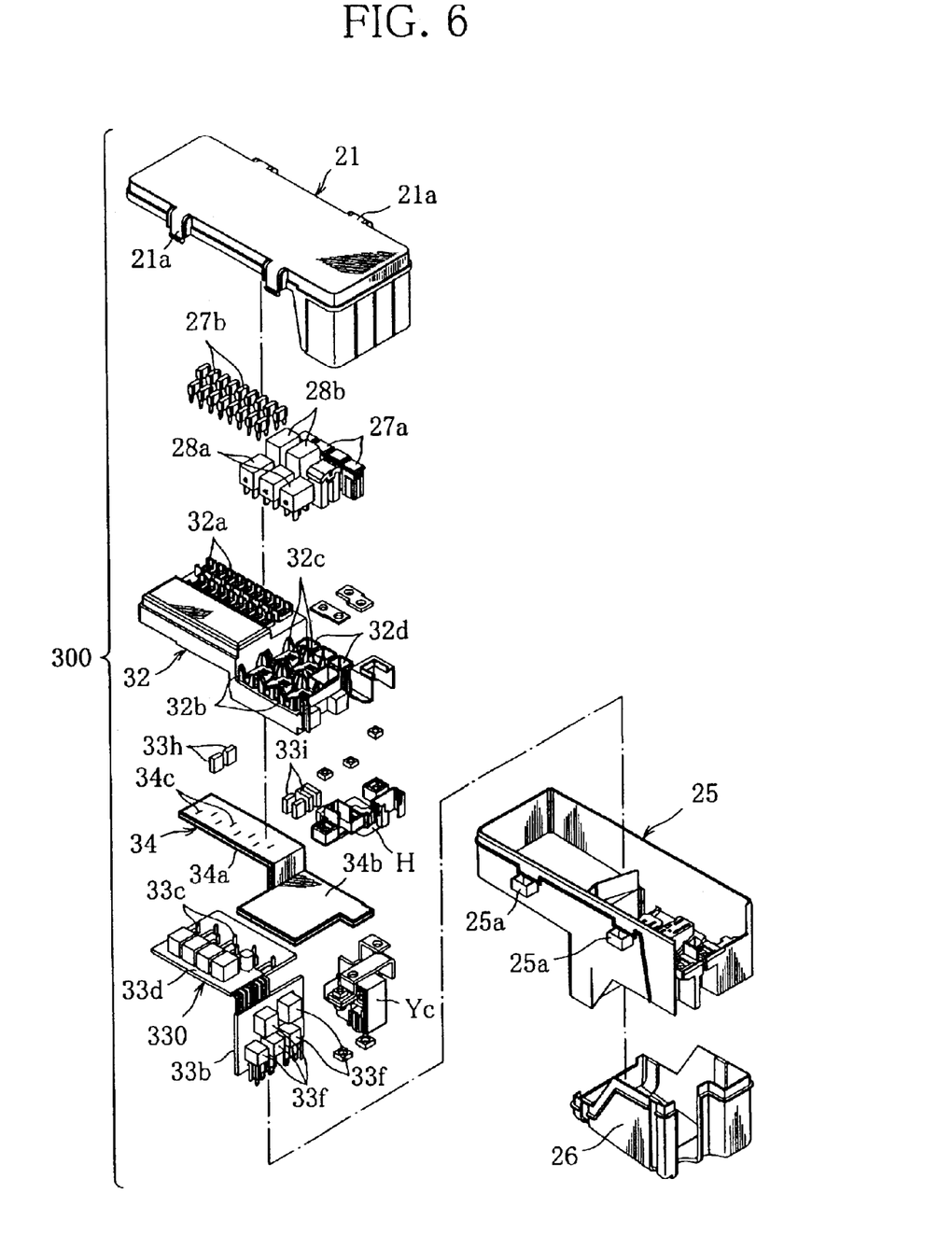
FIG. 6 is an exploded schematic view of an electric connection box according to a sixth embodiment.

FIG. 6 shows an electric connection box 300 according to a sixth embodiment of this invention. As compared to the electric connection box 30 of the third embodiment, the electric connection box 300 differs in the construction of the relay module 330 but is the same in the other respects.

Specifically, the relay module 330 is only provided with the power control section 33b on which exposed relays 33f are mounted, without having the communication control section. The power control section 33b of the electric connection box 300 is the same in construction and control as the third and fourth embodiments.

The electric connection boxes 300 is easy to make compact in size and light in weight by having the relay module 330 accommodated in the cases, and is less wasteful in various aspects so that low fabrication cost is achieved. As in the third embodiment, the connection box achieves advantageous functions based on the arrangement and construction of the relay module 330.

In the above, various embodiments of this invention have been explained based on concrete examples. The present invention is not limited to these embodiments, and various modifications may be made. For instance, shapes, configurations and layouts of various parts, which have been explained by way of preferred examples in the embodiments with illustrations, may be modified in embodying the present invention.

What is claimed is:

1. In an electric connection box which comprises a case having at least bus bars, fuses and first relays accommodated therein, the improvement comprising:
   a relay module accommodated in said case and mounted with second relays;
      wherein said relay module comprises a communication control section for multiplex communication, and a power control section for distributing electric power under control of said communication control section, and wherein said fuses and said first relays are disposed so as to be divided into fuses and relays that are large in calorific value and fuses and relays that are small in calorific value, and said relay module is disposed on a side close to the fuses and relays that are small in calorific value.

2. The electric connection box according to claim 1, wherein said relay module solely comprises a power control section for distributing electric power.

3. The electric connection box according to claim 1, wherein said power control section includes bus bars molded with insulator, and said fuses are mounted on said bus bars directly or indirectly.

4. The electric connection box according to claim 3, wherein said power control section includes relay terminals through which said bus bars are connected to said fuses.

5. The electric connection box according to claim 4, wherein said power control section includes tabs provided in said bus bars, and said tabs are connected to said relay terminals.

6. The electric connection box according to claim 2, wherein said power control section includes bus bars molded with insulator, and said fuses are mounted on said bus bars directly or indirectly.

7. The electric connection box according to claim 6, wherein said power control section includes relay terminals through which said bus bars are connected to said fuses.

8. The electric connection box according to claim 7, wherein said power control section includes tabs provided in said bus bars, and said tabs are connected to said relay terminals.

9. The electric connection box according to claim 1, wherein said relay module is fastened within said case by means of screws, whereby said relay module is electrically and/or mechanically connected to said electric connection box.

10. The electric connection box according to claim 2, wherein said second relays are mounted on said power control section.

* * * * *